(12) United States Patent
Kao et al.

(10) Patent No.: US 8,256,906 B2
(45) Date of Patent: Sep. 4, 2012

(54) SLIDING COVER STRUCTURE AND AN ELECTRONIC APPARATUS

(75) Inventors: Hsu-Chi Kao, Sindian (TW); Way-Han Dai, Linkou Township, Taipei County (TW); Chao-Yu Lee, Sijhih (TW); Ching-Hong Huang, Keelung (TW); Yi-Che Yang, Jhonghe (TW)

(73) Assignee: Chief Land Electronic Co., Ltd., Taipei Hsien (TW)

( * ) Notice: Subject to any disclaimer, the term of this patent is extended or adjusted under 35 U.S.C. 154(b) by 497 days.

(21) Appl. No.: 12/501,813

(22) Filed: Jul. 13, 2009

(65) Prior Publication Data

US 2011/0007395 A1    Jan. 13, 2011

(51) Int. Cl.
*G02B 23/16* (2006.01)
*G03B 11/04* (2006.01)

(52) U.S. Cl. ..... 359/511; 359/811; 396/448; 455/575.4; 379/433.12

(58) Field of Classification Search ................... 359/511, 359/811; 396/448; 455/574.4, 575.4; 379/433.12
See application file for complete search history.

(56) References Cited

U.S. PATENT DOCUMENTS

| 4,219,265 | A | * | 8/1980 | Waaske | 396/349 |
|---|---|---|---|---|---|
| 5,130,853 | A | * | 7/1992 | Sakurai | 359/803 |
| 5,765,068 | A | * | 6/1998 | Kamoda | 396/448 |
| 6,135,652 | A | * | 10/2000 | Owashi et al. | 396/349 |
| 6,302,598 | B1 | * | 10/2001 | Shiono et al. | 396/349 |
| 6,347,893 | B1 | * | 2/2002 | Shiono et al. | 396/448 |
| 6,398,426 | B1 | * | 6/2002 | Takanashi | 396/448 |
| 7,437,186 | B2 | * | 10/2008 | Park | 455/575.4 |
| 7,938,586 | B2 | * | 5/2011 | Matsumoto | 396/448 |
| 8,014,844 | B2 | * | 9/2011 | Dai et al. | 455/575.4 |

* cited by examiner

*Primary Examiner* — Ricky D Shafer
(74) *Attorney, Agent, or Firm* — Houtteman Law LLC

(57) ABSTRACT

A sliding cover structure and an electronic apparatus are disclosed. The sliding cover structure is used for covering a lens, and includes a base, a first cover, a second cover and a swing part. The first cover slides forwards and backwards on the base, and slides between an opening position that does not cover the lens and a closing position that covers the lens. The second cover moves upwards and downwards on the base. The swing part is pivoted with the base and has a first contact end and a second contact end. The pivoting position of the swing part and the base is located between the first contact end and the second contact end so that the swing part can perform a seesaw operation. The first contact end is located below the second cover so that the first contact end drives the second cover to move upwards.

20 Claims, 13 Drawing Sheets

SLIDING COVER STRUCTURE AND AN ELECTRONIC APPARATUS

BACKGROUND OF THE INVENTION

1. Field of the Invention

The present invention relates to a sliding cover structure and an electronic apparatus. In particular, the present invention relates to a sliding cover structure and an electronic apparatus that use a sliding cover to protect the lens

2. Description of Related Art

The electronic apparatus with image photo function, such as cell phones, still cameras, PDAs, etc, has been miniaturized. In order to protect the lens on the electronic apparatus, the housing of the electronic apparatus has a sliding cover. When the sliding cover slides to cover the lens, the electronic apparatus is turned off. Before taking a picture, the user needs to remove the sliding cover and makes the electronic apparatus be in the status of turning on. Then, the user can take a picture.

In order to make the dimension of the electronic apparatus be smaller and smaller, the dimension of the electronic elements are also smaller. When the dimension of the housing of the electronic apparatus becomes smaller, the moving distance of the sliding cover is also smaller. If the sliding cover cannot fully be removed from the original position that covers the lens, the lens will be covered and the user cannot take a picture.

In order to prevent the sliding cover from covering the lens, the sliding cover of the electronic apparatus can be located at the outer side of the housing. Thereby, when the sliding cover is slid, part of the sliding cover extends to outside of the housing of the electronic apparatus so that the lens is not covered. However, the sliding cover that can extends to outside of the housing will be easily damaged or broken due to dropping, compressing, or pumping, etc. The usage life of the electronic apparatus is reduced. Therefore, when the dimension of the electronic apparatus is limited, how to design a sliding cover structure that can protect the lens is a concerned problem.

SUMMARY OF THE INVENTION

One particular aspect of the present invention is to provide a sliding cover structure and an electronic apparatus with a sliding cover to protect the lens.

The present invention provides a sliding cover structure for covering a lens. The sliding cover structure includes a base, a first cover sliding forwards and backwards on the base, a second cover moving upwards and downwards on the base, and a swing part pivoted with the base. The first cover slides between an opening position that does not cover the lens and a closing position that covers the lens. The second cover moves between a rising position that has the same level to the first cover and a falling position that is located below the rising position. The swing part has a first contact end and a second contact end. The pivoting position of the swing part and the base is located between the first contact end and the second contact end so that the swing part can perform a seesaw operation. The first contact end is located below the second cover so that the first contact end drives the second cover to move upwards.

The present invention also provides an electronic apparatus. The electronic apparatus includes a housing having an opening, a lens located in the housing and exposed outside of the opening, and a sliding cover structure. The sliding cover structure includes a base combined with the housing, a first cover located in the opening of the housing, a second cover located in the opening of the housing, and a swing part pivoted with the base. The first cover slides forwards and backwards on the base, and slides between an opening position that does not cover the lens and a closing position that covers the lens. The second cover moves upwards and downwards on the base, and moves between a rising position that has the same level to the first cover and a falling position that is located below the rising position. When the second cover is located at the rising position, the second cover and the first cover cover the opening of the housing. The swing part has a first contact end and a second contact end. The pivoting position of the swing part and the base is located between the first contact end and the second contact end so that the swing part can perform a seesaw operation. The first contact end is located below the second cover so that the first contact end drives the second cover to move upwards.

The present invention has the following characteristics. The sliding cover structure of the present invention has the first cover and the second cover that can cooperate. When the first cover slides to the opening position, the second cover moves to the falling position. When the first cover slides to the closing position, the second cover moves to the rising position. The sliding range of the first cover is not limited. Therefore, even though the dimension of the electronic apparatus is limited, the first cover still can slide in the housing to prevent the cover from being damaged due to the cover extends to outside of the housing and pumps by external force. The number of the components of the sliding cover structure is reduced, and the required space is also decreased.

For further understanding of the present invention, reference is made to the following detailed description illustrating the embodiments and examples of the present invention. The description is for illustrative purpose only and is not intended to limit the scope of the claim.

DETAILED DESCRIPTION OF THE PREFERRED EMBODIMENTS

Figure 1:
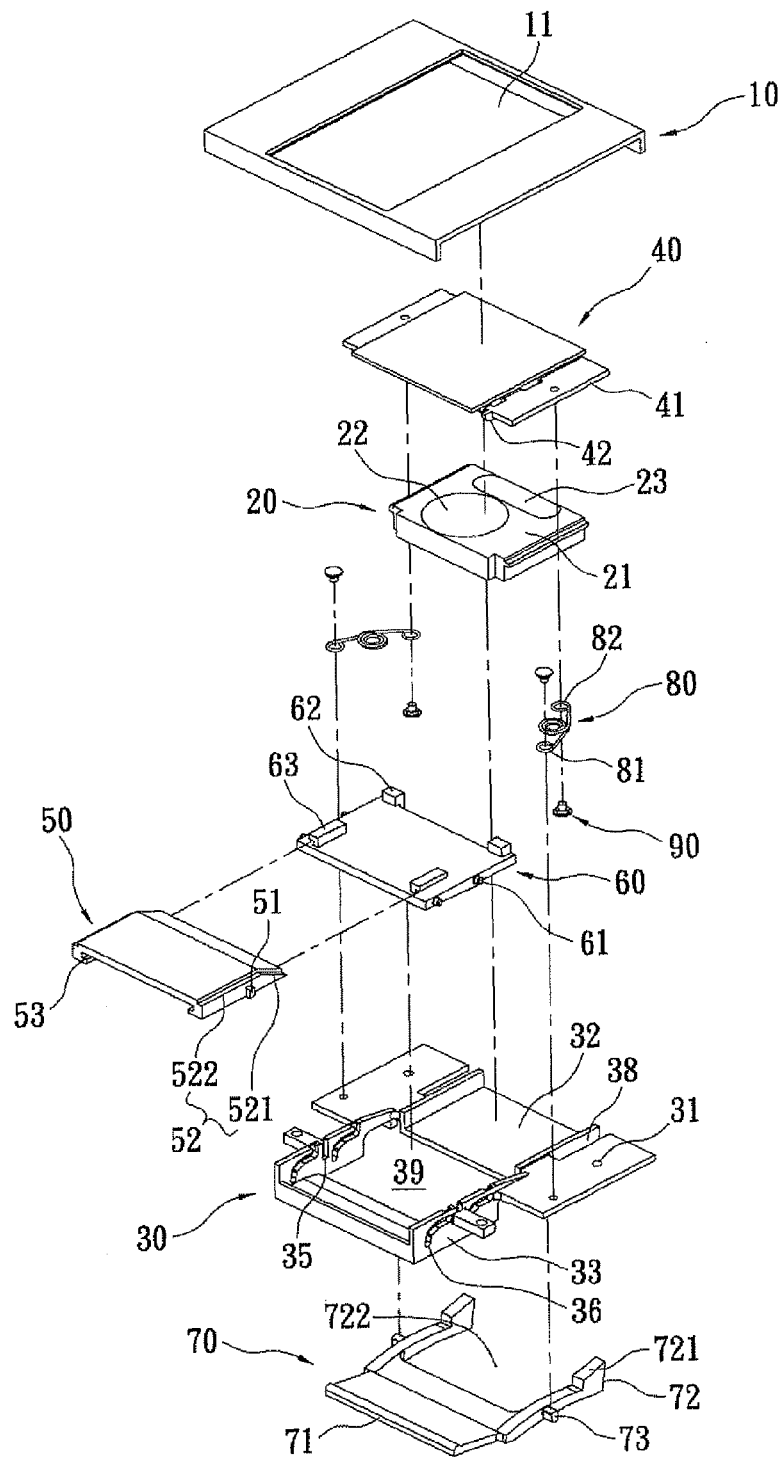
FIG. 1 is an exploded perspective view of the electronic apparatus of the present invention.
Figure 2:
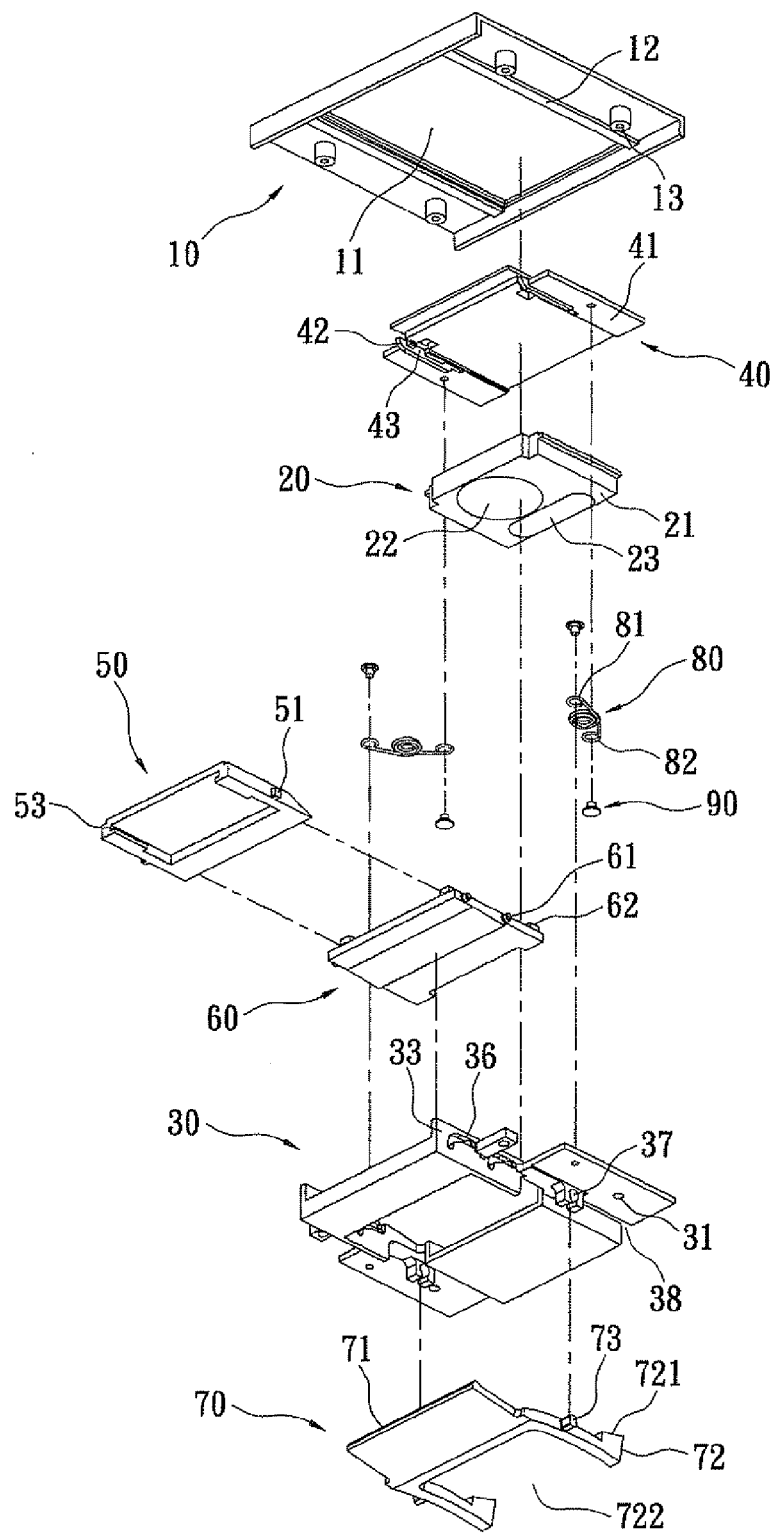
FIG. 2 is another exploded perspective view of the electronic apparatus of the present invention.
Figure 3:
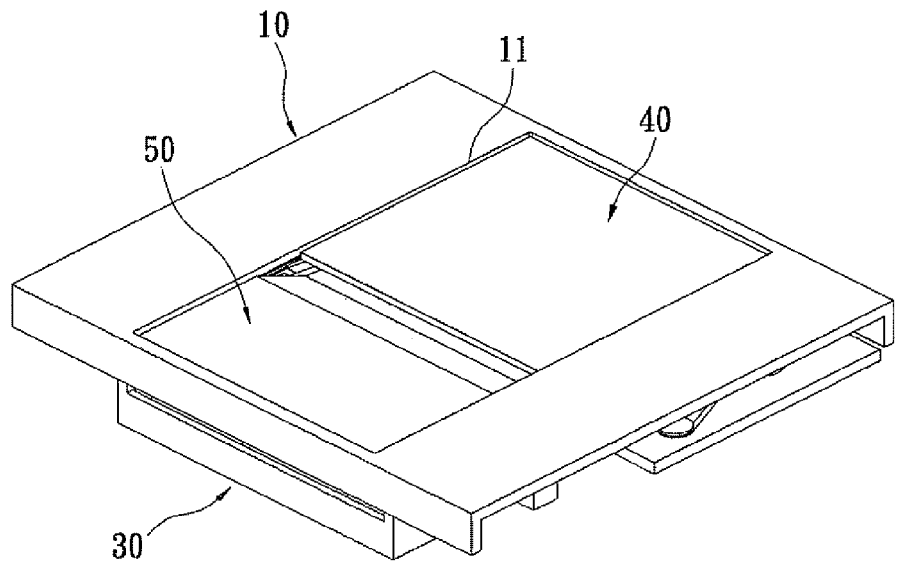
FIG. 3 is an assembly perspective view of the electronic apparatus of the present invention when the first cover is located at the closing position.
Figure 4:
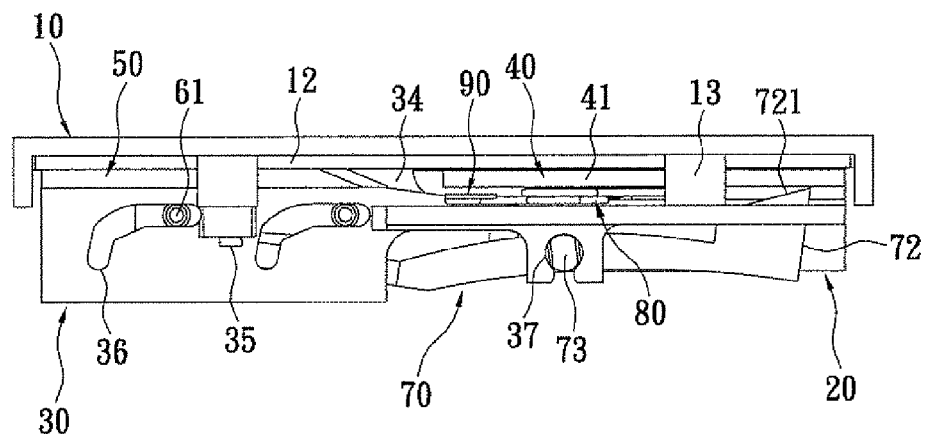
FIG. 4 is a side view of the electronic apparatus of the present invention.
Figure 5:
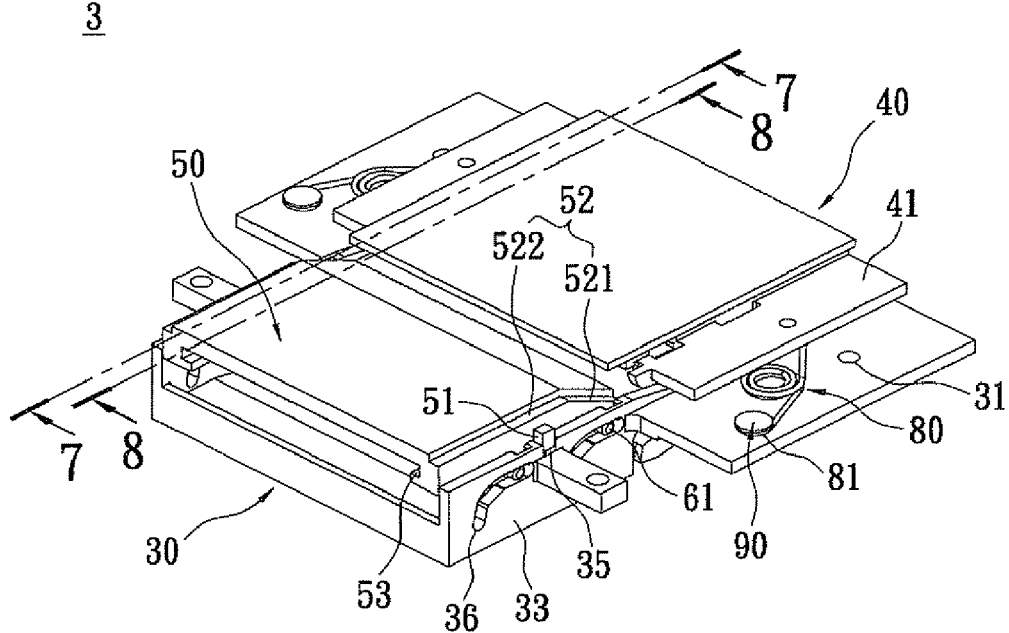
FIG. 5 is an assembly perspective view of the sliding cover structure of the present invention when the first cover is located at the closing position.

Reference is made to FIGS. 1~4. The present invention provides an electronic apparatus. The electronic apparatus can be a cell phone, a PDA, a still camera, etc. The electronic apparatus includes a housing 10, a photo module 20, and a sliding cover structure 3 (as shown in FIG. 5). In order to clearly illustrate the present invention, part of the housing 10 is shown in the figure. The housing 10 has an opening 11. The two sides of the inner wall of the housing 10 that is close to the opening 11 respectively and downwards extrude to from a track rack 12. The bottom of the housing 10 has a plurality of first fastening portions 13 (as shown in FIG. 2).

The photo module 20 is located in the housing 10. The photo module 20 has a main body 21, a lens 22, and a photoflash 23. The lens 22 and the photoflash 23 are assembled on the main body 21, and expose to outside of the top surface of the main body 21.

The sliding cover structure 3 includes a base 30, a first cover 40, a second cover 50, a transmitting part 60 and a swing part 70. The base 30 includes a plurality of second fastening portions 31 that can assembled with first fastening portion 13 of the housing 10 so that the base 30 is assembled and fastened with the housing 10. In this embodiment, the interior of the rear end of the base 30 has a receiving portion 32 for receiving the photo module 20.

The two sides of the front side of the base 30 respectively have a side board 33. The two side boards 33 form a receiving space 39. The two side boards 33 and the two track racks 12 of the housing 10 form two guiding slots 34 (as shown in FIG. 4). Each side board 33 has a position-limit slot 35 that vertically extends to the top surface of the side board 33. Each side board 33 has at least one track slot 36. The height of the track slot 36 becomes lower and lower from the rear end to the front end. In the figure, the two track slots 36 are disposed at interval. The two sides of the base 30 respectively have a pivoting hole portion 37. The rear end of the base 30 has a through slot 38.

Figure 12:
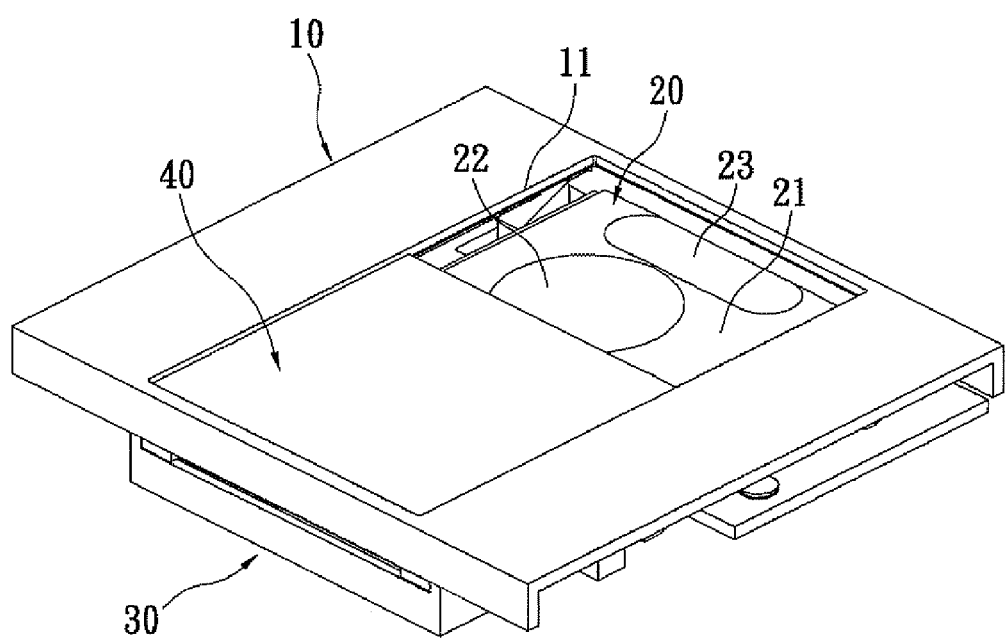
FIG. 12 is an assembly perspective view of the electronic apparatus of the present invention when the first cover is located at the opening position.

The bottom of the first cover 40 has two sliding boards 42. The outer side surfaces of the two sliding boards 42 correspondingly contact the inner side surfaces of the two side boards 33. Thereby, the first cover 40 can slide forwards and backwards on the base 30, and slide between an opening position that does not cover the lens 22 (as shown in FIG. 12) and a closing position that covers the lens 22 (as shown in FIG. 3). The two sides of the first cover 40 horizontally extend to form two wing boards 41. The two wing boards 41 extends into the two guiding slots 34 (as shown in FIG. 4), and the top surfaces of the two wing boards 41 contact the bottom surface of the track racks 12 of the housing 10. The bottom of the first cover 40 has a first matching portion 43. In this embodiment, the first matching portion 43 is a concave slot.

Two sides of the second cover 50 respectively have a position-limit block 51. The two position-limit blocks 51 are movably received in the position-limit slots 35 of the base 30 so that the second cover 50 is movably located on the base 30. The top of the second cover 50 has two sliding tracks 52 for slidably connecting the sliding board 42 of the first cover 40. Each sliding track 52 includes a slanted portion 521 and a horizontal portion 522 connected with the slanted portion 521. The bottom of the front side of the second cover 50 has two sliding slots 53.

Figure 7:
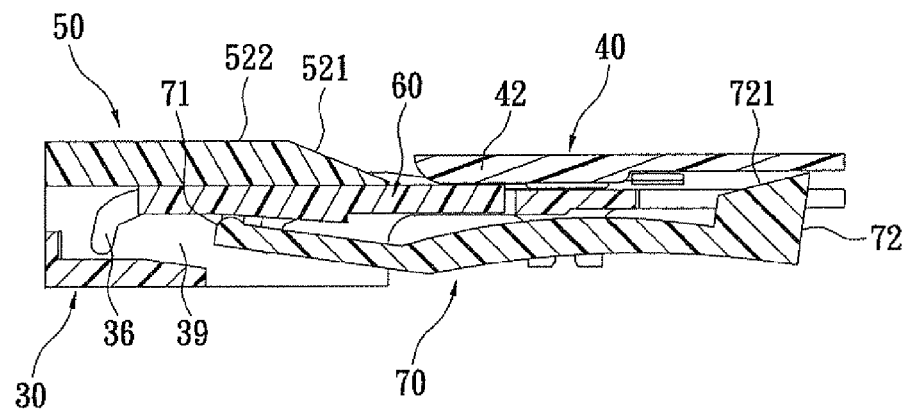
FIG. 7 is a cross-sectional diagram of cross-section 7-7 in FIG. 5.
Figure 14:
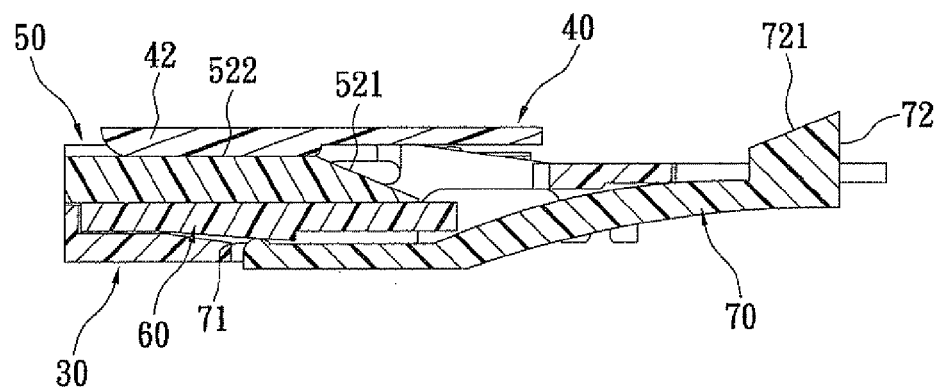

Two sides of the transmitting part 60 respectively have at least one guiding portion 61. The number of the guiding portion 61 is determined by the number of the track slots 36. The guiding slot 61 is movably received in the track slot 36 of the base 30 so that the transmitting part 60 can move along the track slot 36 with respect to the base 10. The rear end of the transmitting part 60 has a second matching portion 62 connected with the first matching portion 43 (the concave slot) of the first cover 40. In this embodiment, the second matching portion 62 is a convex blocks but not limited to above. The convex block is plugged into the concave slot so that the first cover 40 can drive the transmitting part 60 to move. The top of the front side of the transmitting part 60 has two sliding tracks 63. The two sliding tracks 63 are movably located in the two sliding slots 53 of the second cover 50 so that the transmitting part 60 is connected with the lower side of the second cover 50 to make the second cover 50 move. The transmitting part 60 slides with respect to the second cover 50. The second cover 50 can be moved with the transmitting part 60 and moves between a rising position (as shown in FIG. 7) and a falling located (as shown in FIG. 14) located below the rising position. When the second cover 50 is located at the rising position, the top surface of the second cover 50 has the same level with the top surface of the first cover 40.

The front side and the rear side of the swing part 70 respectively have a first contact end 71 and a second contact end 72. The first contact end 71 moves in the receiving space 39 and is located below the second cover 50 and the transmitting part 60 for driving the second cover 50 to move upwards. The center of the second contact end 72 has a concave portion 722. The second contact end 72 can pass through the through slot 38 of the base 30. The top of the second contact end 72 forms a slanted surface 721 that is higher and higher. The sides of the swing part 70 respectively have a pivoting shaft portion 73. The pivoting shaft portion 73 is located between the first contact end 71 and the second contact end 72. The swing part 70 is pivoted with the two pivoting hole portions 37 of the base 30 via the two pivoting shaft portions 73. Thereby, the first contact end 71 and the second contact end 72 of the swing part 70 use the pivoting shaft portions 73 as a supporting point to swing like a seesaw. The first contact end 71 and the second contact end 72 respectively contact the bottom of the transmitting part 60 and the bottom of the first cover 40.

Figure 6:
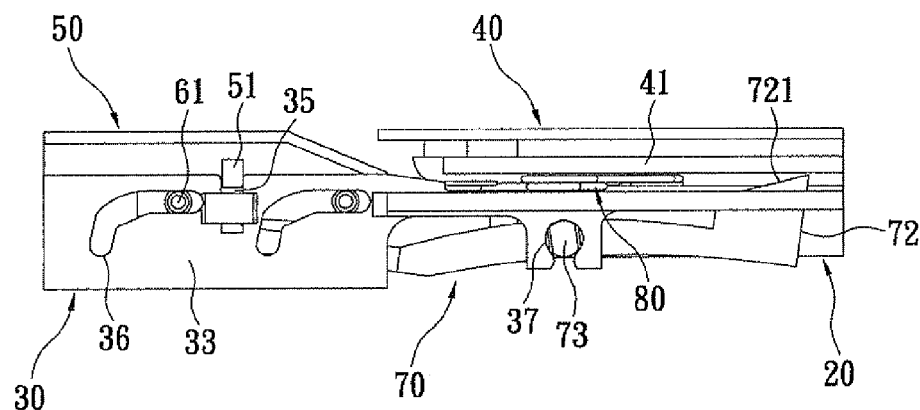
FIG. 6 is a side view of FIG. 5.
Figure 8:
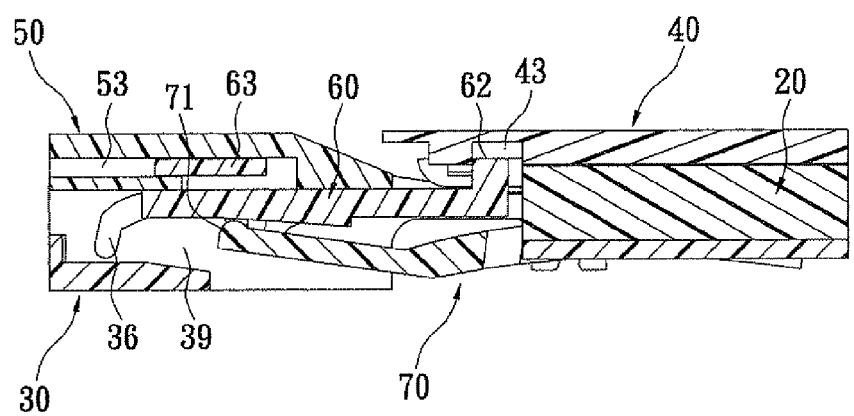
FIG. 8 is a cross-sectional diagram of cross-section 8-8 in FIG. 5.

When the electronic apparatus is turned off, referring to FIGS. 6~8 (the housing is omitted), the first cover 40 is located at the closing position, and the second cover 50 is located at the rising position. The guiding portion 61 of the transmitting part 60 is located at the rear end of the track slot 36. The first contact end 71 of the swing part 70 contacts the bottom of the transmitting part 60. The second contact end 72 contacts the bottom of the first cover 40.

Figure 9:
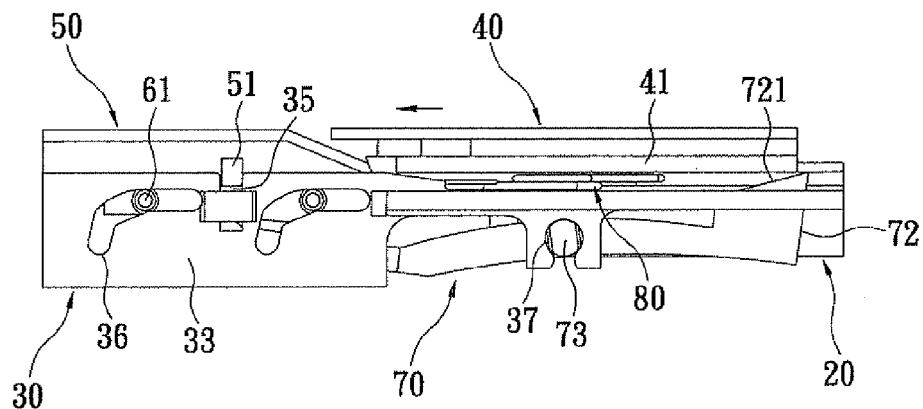
FIGS. 9~11 are side view and cross-sectional diagrams that correspond to FIGS. 6~8 when the first cover slides forwards with a distance.
Figure 10:
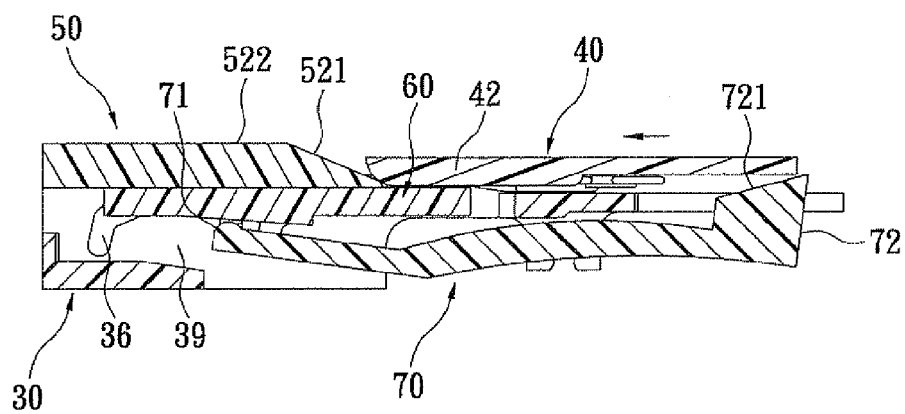
Figure 11:
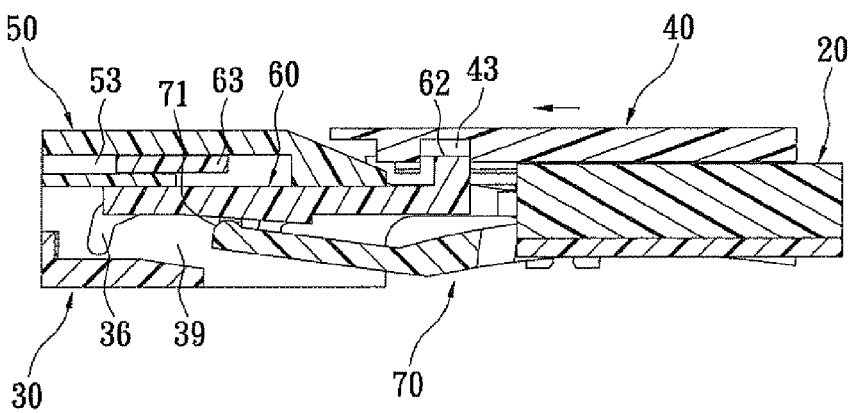

Reference is made to FIGS. 9~11. When the first cover 40 slides forwards with a distance, the sliding board 42 slides to the slanted portion 521 of the second cover 50. By connecting the first matching portion 43 with the second matching portion 62, the transmitting part 60 also moves forwards along the track slot 36 (due to the guiding portion 61 has moved to the middle of the track slot 36). At the same time, the transmitting part 60 slides forwards with respect to the second cover 50.

Figure 13:
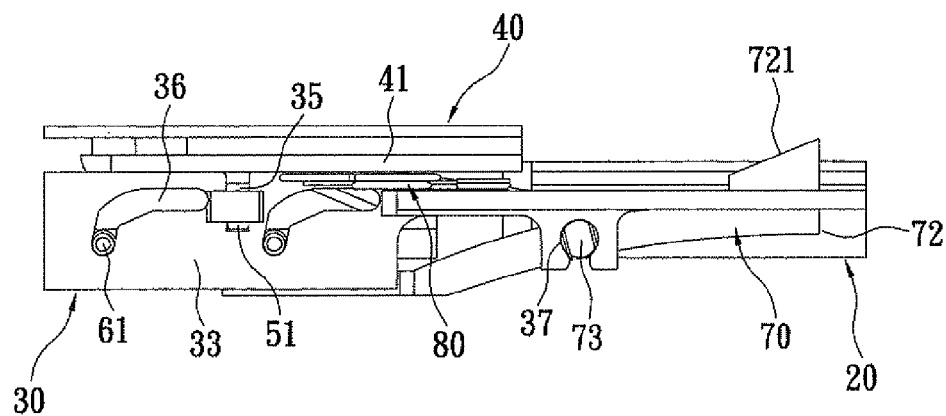
FIGS. 13~15 are side view and cross-sectional diagrams that correspond to FIGS. 6~8 when the first cover is located at the opening position.
Figure 15:
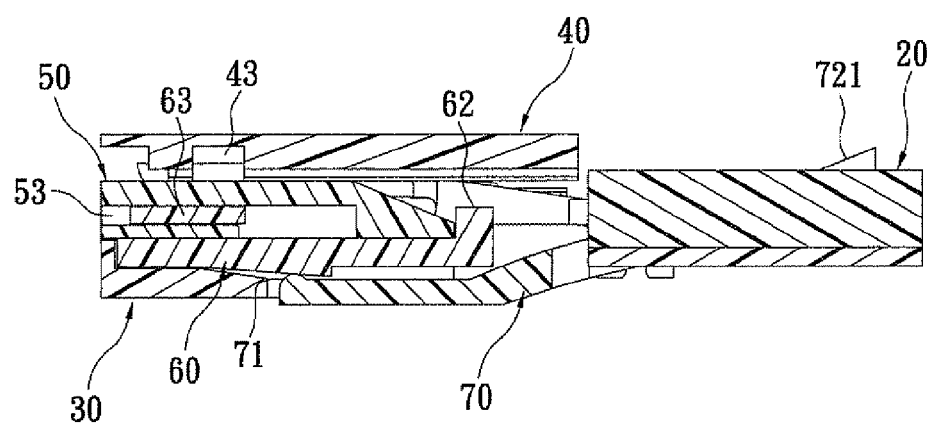

Reference is made to FIGS. 13~15. When the first cover 40 slides to the opening position, the lens 22 is not covered (as shown in FIG. 12). The electronic apparatus is turned on. The sliding board 42 slides to the horizontal portion 522 of the second cover 50. Because the second cover 50 is pressed down by the first cover 40, the second cover 50 moves to the falling position from the rising position and the first cover 40 is stacked on the second cover 50. Because the sliding slot 53 is connected with the sliding track 63, the second cover 50 makes the transmitting part 60 to move downwards. At the same time, the first contact end 71 of the swing part 70 is pressed down by the transmitting part 60 so that the second contact end 72 moves upwards.

Figure 16:
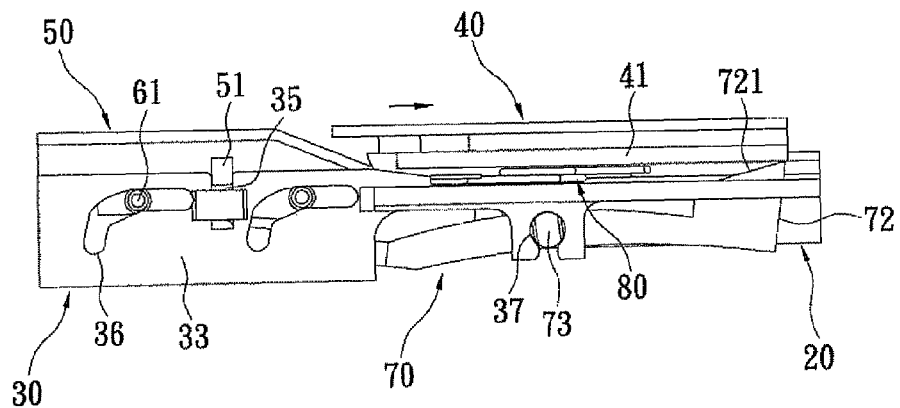
FIGS. 16~18 are side view and cross-sectional diagrams that correspond to FIGS. 6~8 when the first cover slides backwards with a distance.
Figure 17:
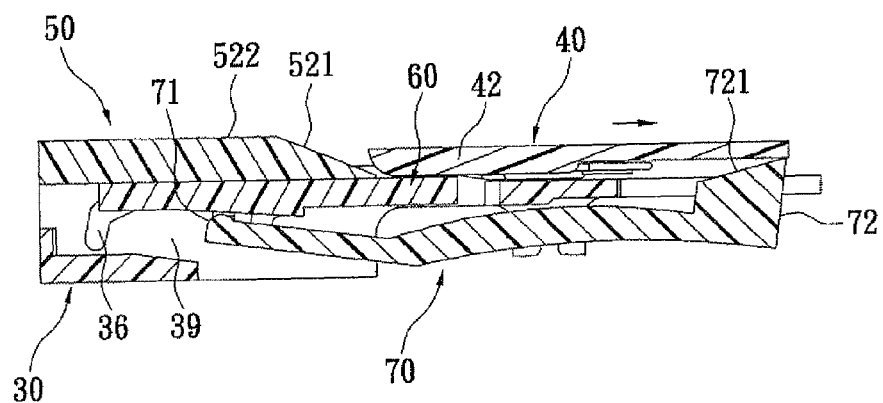
Figure 18:
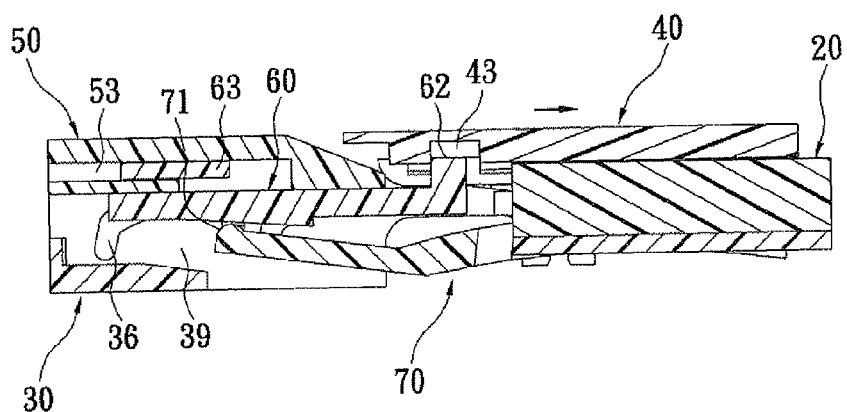

Reference is made to FIGS. 16~18. The first cover 40 slides backwards, the sliding board 42 slides downwards along the slanted portion 521 of the second cover 50 and the first cover 40 presses the second contact end 72 of the swing part 70 downwards. Thereby, the first contact end 71 moves upwards to contact and push the transmitting part 60. At the same time, because the first matching portion is connected with the second matching portion, the transmitting part 60 moves backwards along the track slot 36 (the guiding portion 61 has been moved back to the middle of the track slot). The second cover 50 moves upwards from the falling position.

Because the slanted surface 721 of the top of the second contact end 72 is higher and higher, the first cover 40 slides backward to contact the second contact end 72. By guided by the slanted surface 721, the first contact end 71 smoothly pushes the transmitting part 60 upwards so that the second cover 50 smoothly moves upwards.

Finally, the first cover 40 recovers to the closing position, as shown in FIGS. 6~8, and the second cover 50 and the first cover 40 both cover the opening 11 of the housing 10 to fully cover the lens 22 (as shown in FIG. 3).

Reference is made to FIGS. 1~3 again. The sliding cover structure 3 further includes at least one flexible part 80. The flexible part 80 is a spring. The flexible part 80 has a first end 81 and a second end 82. The first end 81 and the second end 82 of the flexible part 80 can be matched with two rivets 90 so that the first end 81 is pivoted with the base 30 and the second end 82 is pivoted with the first cover 40 and can be moved synchronously with the first cover 40. Thereby, the flexible part 80 is located between the base 30 and the first cover 40. The number of the flexible part 80 is not limited to a specific one. In the figure, there are two flexible parts 80.

By utilizing the semi-automatic sliding function generated from the flexible force of the two flexible parts 80. After the pivoted position of the first cover 40 and the second end 82 of the flexible part 80 passes through the pivoting position of the base 30 and the first end of the flexible part 80, the first cover 40 automatically slides to a positioned position.

Figure 19:
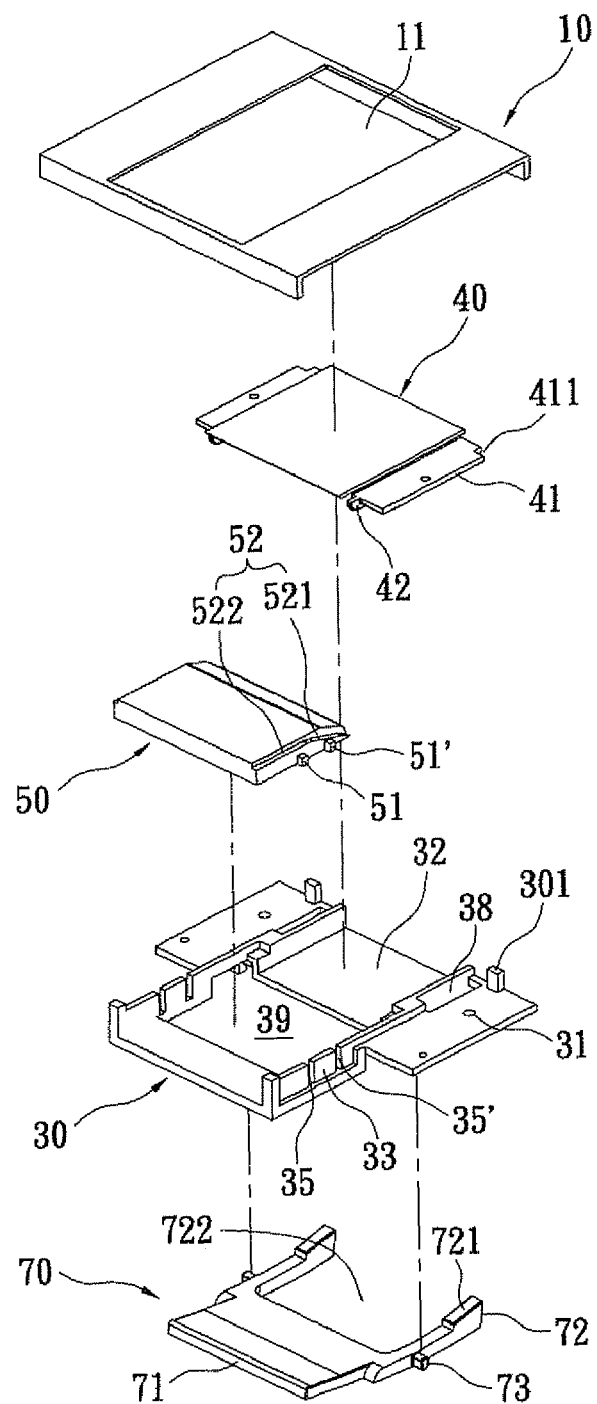
FIG. 19 is an exploded perspective view of the electronic apparatus of the second embodiment of the present invention.
Figure 20:
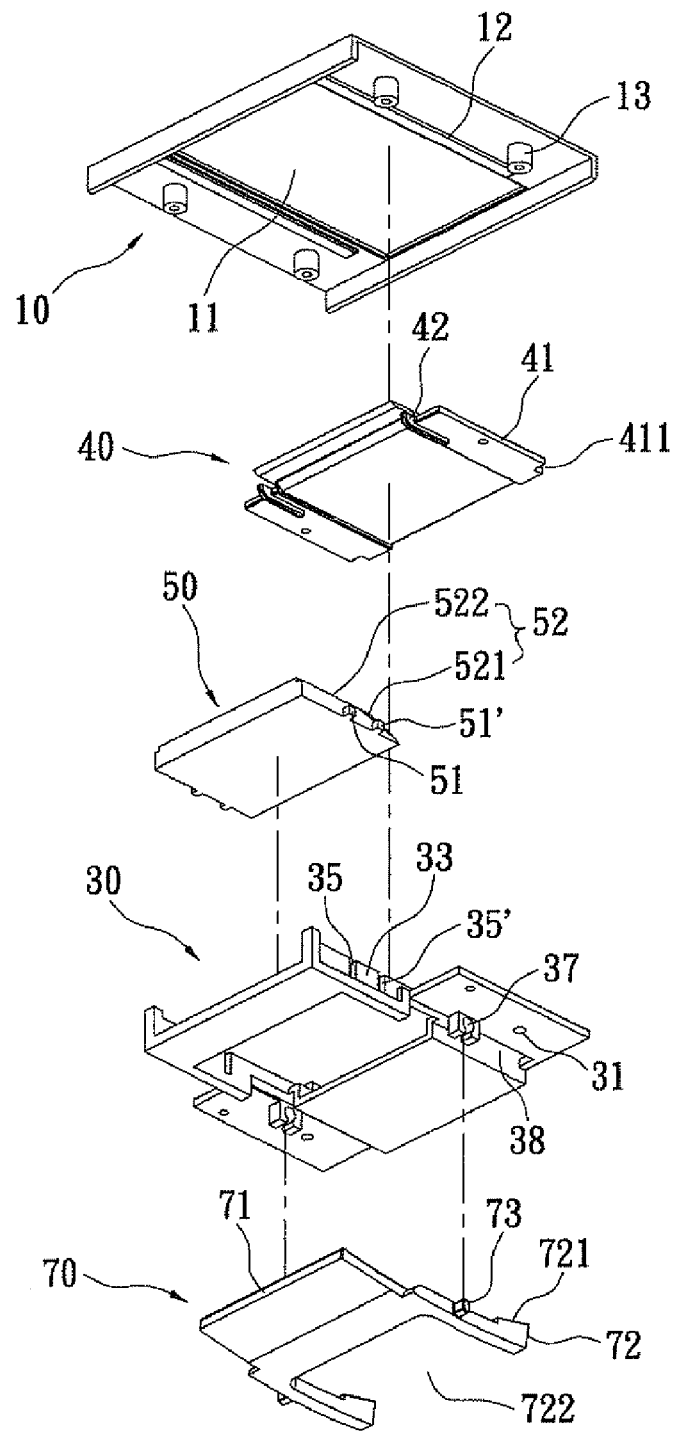
FIG. 20 is another exploded perspective view of the electronic apparatus of the second embodiment of the present invention.
Figure 21:
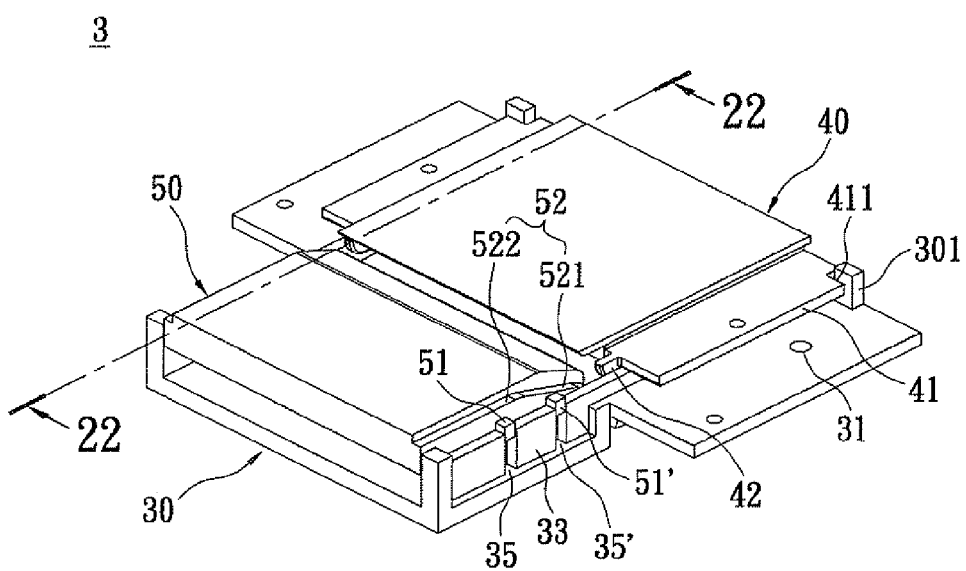
FIG. 21 is an assembly perspective view of the sliding cover structure of the second embodiment of the present invention when the first cover is located at the closing position.

Reference is made to FIGS. 19~21. The electronic apparatus has another kind of sliding cover structure 3. The difference between the present invention between the previous endowments is that the transmitting part 60 is omitted. Besides, the base 30 has a plurality of blocking portions 301. The rear end of the first cover 40 has a plurality of second blocking portions 411 that correspondingly block the first blocking portions 301. When the first cover 40 slides backwards, the first cover 40 is blocked and positioned at the closing position. In this embodiment, the first block portion 301 is a convex block and the second blocking portion 411 is an opening slot, but not limited to above. Two sides of the second cover 50 further has another position-limit block 51' that is disposed with the position-limit block at interval. The side board 33 of the base 30 that corresponds to the position-limit block 51' has another position-limit slot 35' so that the position-limit block 51' can be received in the position-limit slot 35'. The stability is enhanced when the second cover 50 moved upwards and downwards. The first contact end 71 of the swing part 70 is located below the second cover 50 and directly contacts the bottom of the second cover 50 for driving the second cover 50 to move upwards.

Figure 22:
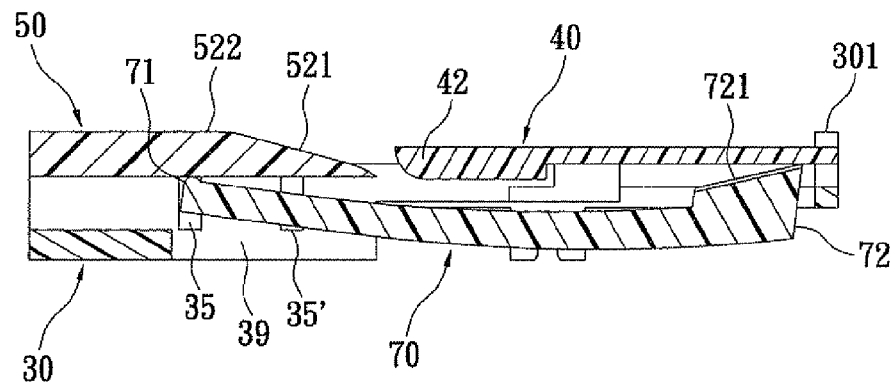
FIG. 22 is a cross-sectional diagram of cross-section 22-22 in FIG. 21.
Figure 23:
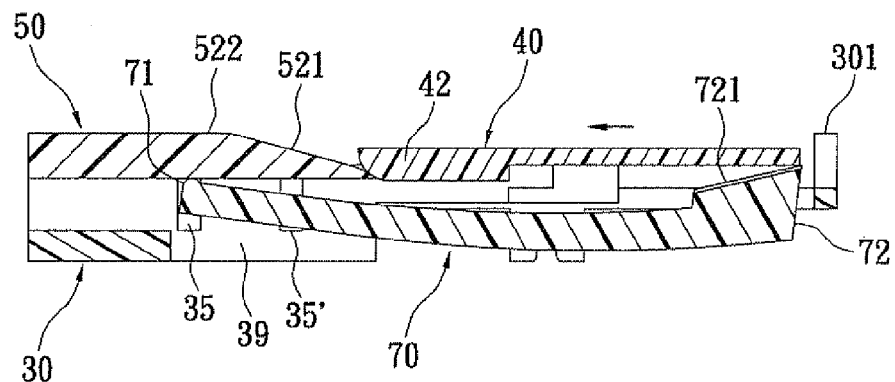
FIG. 23 is a cross-sectional diagram of the sliding cover structure of the second embodiment of the present invention when the first cover slides forwards with a distance.
Figure 24:
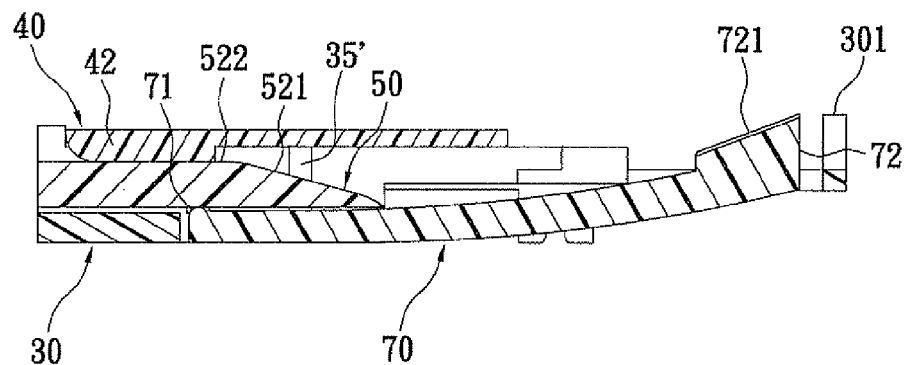
FIG. 24 is a cross-sectional diagram of the sliding cover structure of the second embodiment of the present invention when the first cover is located at the opening position.

The operations of the sliding cover structure 3 are illustrated in FIGS. 22~24. The housing 10 is not shown in the figures.

Reference is made to FIG. 22. The electronic apparatus is turned off, the first cover 40 is located at the closing position, and the second cover 50 is located at the rising position.

Reference is made to FIG. 23. When the first cover 40 slides forwards with a distance, the sliding board 42 slides to the slanted portion 521 of the second cover 50. The first cover 40 presses the second cover 50 down so that the second cover 50 moves downwards.

Reference is made to FIG. 24. The electronic apparatus is turned on. The first cover 40 slides to the opening position, and the sliding board 42 slides to the horizontal portion 522 of the second cover 50. The second cover 50 moves to the falling position from the rising position, and the first cover 40 is stacked on the second cover 50. The first contact end 71 of the swing part 70 is pressed down by the second cover 50 so that the second contact end 72 moves upwards.

Reference is made to FIG. 22 again. If the user wants to recover the electronic apparatus back to the closing mode, the user merely needs to slide the first cover 40 backwards to the closing position. The first cover 40 presses the second contact end 72 of the swing part 70 so that the first contact end 71 moves upwards to push the second cover 50 moves upwards to the rising position from the falling position. Thereby, the second cover 50 and the first cover 40 covers on the opening 11 of the housing 10 (also referring to FIG. 19).

Moreover, the flexible part 80 also can be applied to this embodiment so that the first cover 40 has the semi-automatic sliding function.

The sliding cover structure of the present invention has the first cover and the second cover that can be matched. When the first cover slides to the opening position, the second cover moves to the falling position. When the first cover slides to the closing position, the second cover moves to the rising position. The sliding range of the first cover is not limited. Therefore, even though the dimension of the electronic apparatus is limited, the first cover still can slide in the housing to prevent the cover from being damaged due to the cover extends to outside of the housing and pumps by external force. The number of the components of the sliding cover structure is reduced, and the required space is also decreased.

The description above only illustrates specific embodiments and examples of the present invention. The present invention should therefore cover various modifications and variations made to the herein-described structure and operations of the present inventions provided they fall within the scope of the present invention as defined in the following appended claims.

What is claimed is:
1. A sliding cover structure for covering a lens, comprising:
a base;

a first cover sliding forwards and backwards on the base, wherein the first cover slides between an opening position that does not cover the lens and a closing position that covers the lens;

a second cover moving upwards and downwards on the base, wherein the second cover moves between a rising position that has the same level to the first cover and a falling position that is located below the rising position; and a swing part pivoted with the base, wherein the swing part has a first contact end and a second contact end, a pivoting position of the swing part and the base is located between the first contact end and the second contact end so that the swing part performs a seesaw operation, the first contact end is located below the second cover so that the first contact end drives the second cover to move upwards.

2. The sliding cover structure as claimed in claim 1, further comprising a transmitting part, wherein the transmitting part is movably located at the base and is connected below the second cover to make the second cover be moved, and the first contact end of the swing part contacts a bottom of the transmitting part.

3. The sliding cover structure as claimed in claim 2, wherein two sides of the base respectively have a track slot, the track slot is lower and lower from a rear end to a front end, two sides of the transmitting part respectively have a guiding portion, and the two guiding portions of the transmitting part are movably received in the two track slots of the base so that the transmitting part moves along the track slot with respect to the base.

4. The sliding cover structure as claimed in claim 3, wherein a top of the second contact end of the swing part forms a slanted surface.

5. The sliding cover structure as claimed in claim 4, wherein a rear end of the first cover has a first matching portion, and the transmitting part has a second matching portion that is linked with the first matching portion.

6. The sliding cover structure as claimed in claim 5, wherein the transmitting part has two sliding tracks, the second cover has two sliding slots, and the two sliding tracks are movably located in the two sliding slots so that the transmitting part can slide with respect to the second cover.

7. The sliding cover structure as claimed in claim 6, wherein the first cover has two sliding boards, and the second cover has two sliding tracks that are correspondingly connected with the two sliding boards.

8. The sliding cover structure as claimed in claim 7, wherein the sliding tracks of the second cover includes a slanted portion, and a horizontal portion that is connected with the slanted portion.

9. The sliding cover structure as claimed in claim 8, wherein the second cover has two position-limit blocks, the base has two position-limit slots, and the two position-limit blocks are movably received in the two position-limit slots.

10. The sliding cover structure as claimed in claim 1, further comprising a flexible part, wherein the flexible part has a first end and a second end, the first end is pivoted with the base, the second end is pivoted with the first cover and moves synchronously with the first cover, and after a pivoted position of the first cover and the second end of the flexible part passes through a pivoted position of the base and the first end of the flexible part, the flexible part externally extends to exert a push force to the first cover.

11. The sliding cover structure as claimed in claim 1, wherein the first contact end of the swing part contacts a bottom of the second cover.

12. The sliding cover structure as claimed in claim 11, wherein a top of the second contact end of the swing part forms a slanted surface.

13. The sliding cover structure as claimed in claim 12, wherein the first cover has two sliding boards, and the second cover has two sliding tracks that are correspondingly slid by the two sliding boards.

14. The sliding cover structure as claimed in claim 13, wherein the sliding tracks includes a slanted portion, and a horizontal portion that is connected with the slanted portion.

15. The sliding cover structure as claimed in claim 14, wherein the second cover has two position-limit blocks, the base has two position-limit slots, and the two position-limit blocks are movably received in the two position-limit slots.

16. The sliding cover structure as claimed in claim 15, wherein the base has a plurality of the first blocking portions, and the second cover has a plurality of second blocking portions that correspondingly block the first blocking portions.

17. The sliding cover structure as claimed in claim 11, further comprising a flexible part, wherein the flexible part has a first end and a second end, the first end is pivoted with the base, the second end is pivoted with the first cover and moves synchronously with the first cover, and after a pivoted position of the first cover and the second end of the flexible part passes through a pivoted position of the base and the first end of the flexible part, the flexible part externally extends to exert a push force to the first cover.

18. An electronic apparatus, comprising:
a housing having an opening;
a lens located in the housing and exposed to outside of the opening; and
a sliding cover structure, comprising:
a base combined with the housing;
a first cover sliding forwards and backwards on the base, wherein the first cover slides between an opening position that does not cover the lens and a closing position that covers the lens;
a second cover moving upwards and downwards on the base, wherein the second cover moves between a rising position that has the same level to the first cover and a falling position that is located below the rising position, when the second cover is located at the rising position, the second cover and the first cover cover the opening of the housing; and
a swing part pivoted with the base, wherein the swing part has a first contact end and a second contact end, a pivoting position of the swing part and the base is located between the first contact end and the second contact end so that the swing part performs a seesaw operation, the first contact end is located below the second cover so that the first contact end drives the second cover to move upwards.

19. The electronic apparatus as claimed in claim 18, further comprising a transmitting part, wherein the transmitting part is movably located at the base and is connected below the second cover to make the second cover be moved, and the first contact end of the swing part contacts a bottom of the transmitting part.

20. The electronic apparatus as claimed in claim 18, wherein the first contact end of the swing part contacts a bottom of the second cover.

* * * * *